United States Patent
McGrath et al.

(10) Patent No.: US 10,324,624 B2
(45) Date of Patent: Jun. 18, 2019

(54) DECOMMISSIONING OF SOURCE STORAGES

(71) Applicant: EntIT Software LLC, Sunnyvale, CA (US)

(72) Inventors: Michael Peter McGrath, London (GB); Veena Setlur, Pleasanton, CA (US); Samuel Hald Yan, Pleasanton, CA (US); Jay Fu, Pleasanton, CA (US); Meide Zhao, Pleasanton, CA (US); Kit Man So, Pleasanton, CA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 0 days.

(21) Appl. No.: 15/633,149

(22) Filed: Jun. 26, 2017

(65) Prior Publication Data
US 2018/0373430 A1    Dec. 27, 2018

(51) Int. Cl.
*G06F 3/06* (2006.01)

(52) U.S. Cl.
CPC .......... *G06F 3/0604* (2013.01); *G06F 3/0643* (2013.01); *G06F 3/0647* (2013.01); *G06F 3/0652* (2013.01); *G06F 3/0683* (2013.01)

(58) Field of Classification Search
CPC ................................................. G06F 3/0647
See application file for complete search history.

(56) References Cited

U.S. PATENT DOCUMENTS

| | | | |
|---|---|---|---|
| 8,239,644 B2 | 8/2012 | Asano et al. | |
| 8,335,768 B1 | 12/2012 | Desai et al. | |
| 8,495,026 B1 | 7/2013 | Gunda et al. | |
| 8,768,897 B2 | 7/2014 | Artishdad et al. | |
| 9,250,823 B1* | 2/2016 | Kamat | G06F 3/0647 |
| 2006/0224844 A1* | 10/2006 | Kano | G06F 3/0605 711/162 |
| 2010/0077158 A1* | 3/2010 | Asano | G06F 3/0605 711/154 |
| 2013/0238563 A1 | 9/2013 | Amarendran et al. | |
| 2014/0068211 A1* | 3/2014 | Fiske | G06F 11/1456 711/162 |

OTHER PUBLICATIONS

Queensland State Archives, "Migrating digital records", Department of Science, Information Technology and Innovation; Jun. 2012; 57 pages.

* cited by examiner

*Primary Examiner* — Edward J Dudek, Jr.

(57) ABSTRACT

According to examples, an apparatus may include a processor and a non-transitory computer readable medium storing instructions that cause the processor to classify files stored on a source storage into files for deletion and files for migration based on a storage policy and meta-data, generate aliases to link the files classified for migration to a location on a target storage, copy the files classified for migration from the source storage to the linked location on the target storage, and determine whether the files copied onto the target storage are identical to the files classified for migration on the source storage using a digital key. In response to a determination that the copied files are identical to the files classified for migration, the processor may activate the generated aliases and may decommission the source storage.

15 Claims, 7 Drawing Sheets

META-DATA 118

"Encrypted ZDK", "Sender", "Recipient", "Subject", "BillingEventId", "Repositories", "DocRcvdDate", "DocType"
"GFL5K6q7RmQYZZFND9T/Rr3LHG2Q9frZFreNJO/C1vv4tugJgDLmDxVlnVLXmvPXi0V7q0mCfW5/J3lzXsLE1nC9fl+Zo8q90ywcXjL24n+yol
: :

US 10,324,624 B2

DECOMMISSIONING OF SOURCE STORAGES

BACKGROUND

Digital storage of files are used in a wide variety of applications such as storage of files for compliance, storage of files for litigation, storage of personally identifiable information, storage of financial information, etc. Files are stored on hardware storage devices such as hard disk drives, solid state drives and tape drives. In addition, different types and standards of protection are often employed to protect the files.

BRIEF DESCRIPTION OF THE DRAWINGS

Features of the present disclosure are illustrated by way of example and not limited in the following Figure(s), in which like numerals indicate like elements, in which.

DETAILED DESCRIPTION

Figure 1A:
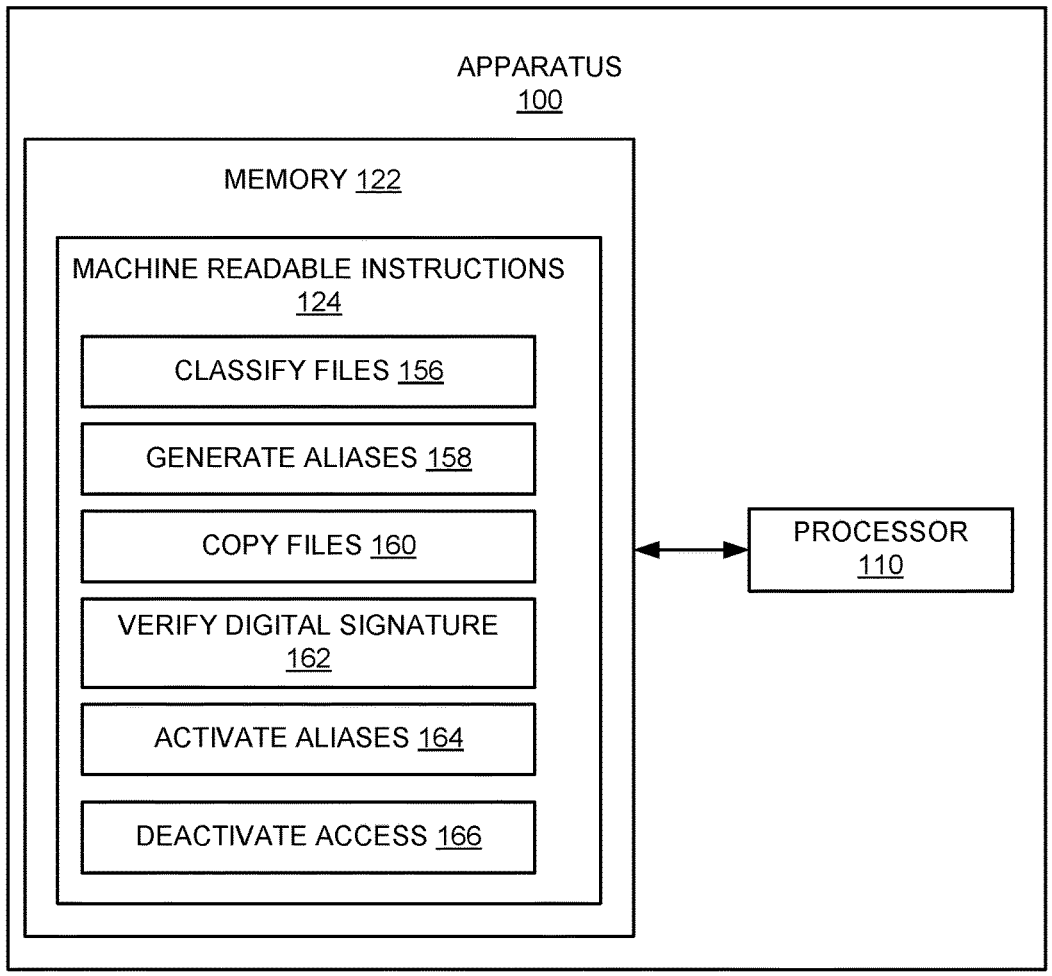
FIG. 1A shows a block diagram of an example apparatus for decommissioning of a source storage.

For simplicity and illustrative purposes, the present disclosure is described by referring mainly to an example thereof. In the following description, numerous specific details are set forth in order to provide a thorough understanding of the present disclosure. However, the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

An apparatus, according to an example of the present disclosure, selectively copies files on a source storage to a target storage while leaving files that are to be deleted on the source storage and may decommission the source storage. Decommissioning of the source storage may include disabling of the source storage, ceasing use of the source target, e.g., stopping access to the files stored on the source storage in response to requests for the files, etc. Prior to decommissioning the source storage, the apparatus may determine whether the files copied on the target storage are identical to the files on the source storage using a digital key. In this regard, the apparatus may not decommission the source storage until a determination is made that the copied files on the target storage are identical to the files on the source storage.

The apparatus may also redirect input/output requests to the copied files on the target storage using aliases prior to decommissioning of the source storage. The decommissioned source storage may be degaussed and/or shredded to destroy all of the files on the source storage. In this regard, the files on the source storage may be deleted through destruction of the source storage. The apparatus may further generate a certificate of destruction after the source storage is destroyed. Thus, the apparatus may delete files subject to compliance requirements. Additionally, the apparatus may copy data that is subject to compliance requirements, from the source storage to the target storage.

The apparatus disclosed herein may classify files for deletion using meta-data of the files on the source storage and a storage policy. The storage policy may be a set of rules associated with managing the files such as how or when files may be deleted, whether the files may be copied, compliance requirements on files, etc. In an example, a storage policy may be based on Securities Exchange Commission ("SEC") Regulations governing preservation of electronic records such as files in non-rewritable and non-erasable format. Meta-data may be described as data about the files stored on the source storage. For example, meta-data may describe whether the files are non-rewritable or non-erasable. In addition or in another example, meta-data may describe when a file was created or modified.

"Storage" as used herein may be described as a storage device or an array of storage devices. Examples of storage devices may include hard disk drives, solid state drives, tape drives, and/or the like. In an example, storage may include storage devices located in different locations. To meet the SEC regulations, digital archives storing files may require preservation of data integrity, preservation of chain of custody, honoring compliance rules, etc. Files subject to compliance may be described as files stored on the storage, which require preservation of data integrity, preservation of chain of custody, and/or require compliance with the law.

A digital signature may describe a mathematical scheme for demonstrating the authenticity of files. In an example, a digital signature may be used to detect tampering of data stored in the storage. In an example, the digital signature may be based on public-key cryptography such as an RSA algorithm to secure files. A digital key may describe a key such as a public-key or a private key used to authenticate a file. An alias may describe a file that represents another file in a local, remote, or removable file system. The alias may be a dynamic link and may link to files that are moved or renamed. The alias may also be static. For example, the UNIX™ operating system provides dynamic links in some shells, whereas the .lnk shortcut on windows provides a static link.

A technical problem associated with deleting files subject to compliance requirements is how to delete expired files while minimizing processing power and time. Another technical problem pertains to how to migrate files subject to compliance requirements from the source storage to the target storage while minimizing the storage space. The apparatus disclosed herein may delete files subject to compliance requirements by leaving expired files on a source storage device and copying files other than the expired files to a target storage. Thus, the apparatus disclosed herein may save processing power and time because processing of a digital signature to confirm the authenticity of deleted files may be avoided. For example, the files may be classified for deletion using meta-data before the files are excluded from a migration. In addition, the excluded files may not be compared to verify preservation of the files between the source storage and the target storage. Moreover, the expired files are not copied to the target storage, which may increase efficiency in the storage of the copied files.

In an example, using the apparatus disclosed herein for deleting files, the time used to delete the files is inversely proportional to the number of files to be deleted. In contrast, without using the apparatus described herein, the time required to delete the files is directly proportional to the number of files to be deleted. Also, the apparatus disclosed herein, according to an example, may allow for seamless transition between the source storage and the target storage.

With reference to FIG. 1A, there is shown a block diagram of an example apparatus 100 for decommissioning of a source storage. The apparatus 100, which may be a computing device, a server computer, or the like, may manage files on a storage (e.g., a storage device or multiple storage devices). Generally speaking, the apparatus 100 may manage the files on the source storage by migrating files, deleting files, enforcing storage policies, and the like. It should be understood that the apparatus 100 may include additional components and that one or more of the components described herein may be removed and/or modified without departing from a scope of the apparatus 100. For instance, the components of the apparatus 100 are shown as being on a single computing device or server as an example and in other examples the components may exist on multiple computers or servers.

The apparatus 100 may include a processor 110 and a memory 122 that stores machine readable instructions 124 that the processor 110 may execute. The processor 110, which may be a microprocessor, a micro-controller, an application specific integrated circuit (ASIC), a graphical processing unit (GPU), or the like, may perform various processing functions in the apparatus 100. The processing functions that the processor 110 performs, and other functions, operations and methods described herein may be embodied in the machine readable instructions 124. In addition to storing the machine readable instructions 124, the memory 122 may store data or functions, such as storage policy 108 and digital key 102 (shown in FIG. 1B).

As shown in FIG. 1A, the machine readable instructions 124 may store instructions 156 to classify files on a source storage based on the storage policy 108 and meta-data pertaining to the files and instructions 158 to generate aliases for the files that are classified to be copied from the source storage to a target storage. The machine readable instructions 124 may also store instructions 160 to copy the files classified to be copied and instructions 162 to verify that the files copied onto the target storage are identical to corresponding files on the source storage using the digital key 102. The machine readable instructions 124 may further store instructions 164 to activate the generated aliases that point to the copied files on the target storage and instructions 166 to decommission the source storage after the verification.

Figure 1B:
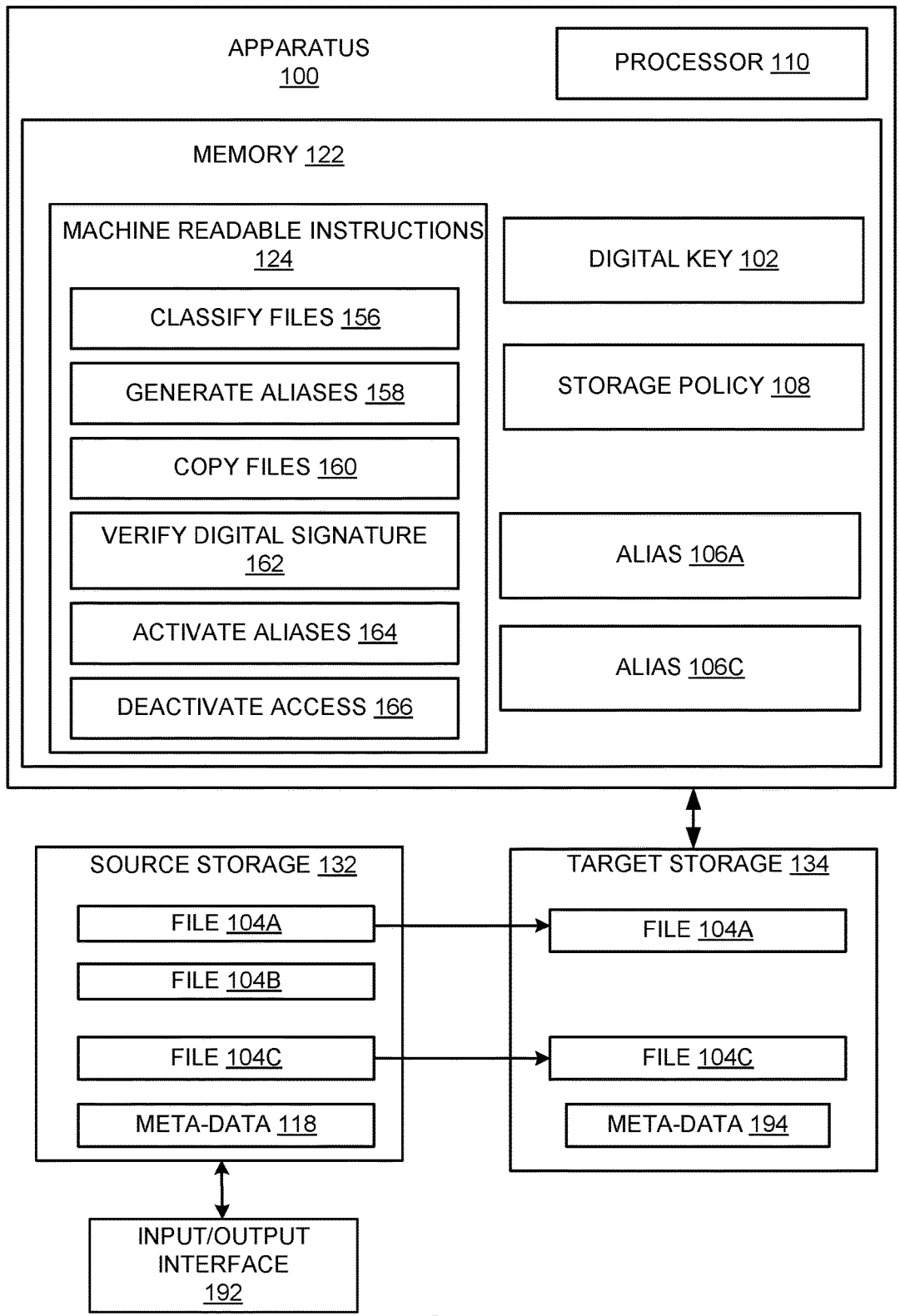
FIG. 1B shows an example file management system including the example apparatus depicted in FIG. 1A.

Turning now to FIG. 1B, there is shown a block diagram of an example file management system including the example apparatus 100 depicted in FIG. 1A. It should be understood that the example file management system may include additional components and that one or more of the components described herein may be removed and/or modified. As shown in FIG. 1B, the apparatus 100 may include the processor 110, the memory 122, and the machine readable instructions 124 discussed with respect to FIG. 1A. The memory 122 may also include a digital key 102, a storage policy 108, and aliases 106A, 106C.

The apparatus 100 may also be in communication with a source storage 132 and a target storage 134. The source storage 132 and/or target storage 134 may exist on multiple computers or servers. The source storage 132 and/or target storage 134 may each include a physical memory, a hard drive, an optical drive, a flash drive, an array of drives, or any combinations thereof, and may include volatile and/or non-volatile data storage.

The source storage 132 may store files 104, shown as 104A, 104B and 104C and meta-data 118, for instance, meta-data 118 of the files 104. The processor 110 may execute the instructions 124 to delete the files 104 stored on the source storage 132 after certain ones of the files 104 have been copied to the target storage 134. That is, the processor 110 may decommission the source storage 132 after the processor 110 has verified that the certain files have been successfully copied to the target storage 134 to thus delete the files 104 on the source storage 132. The processor 110 may classify the files 104 on the source storage 132 to identify files 104 for deletion and/or identify files 104 for copying. The processor 110 may access a storage policy 108 and the meta-data 118 to classify the files 104. In an example, the storage policy 108 may be a set of rules for managing the stored files 104, such as the minimum period for retaining the files 104A, exceptions to the minimum period such as pending litigation, etc.

The meta-data 118 may provide information about the files 104 on the source storage 132. For example, and as discussed below with reference to FIGS. 2A and 2B, the meta-data 118 may provide details such as received date, sender, recipient, subject, file size, etc., for the files 104. By way of particular example, the processor 110 may classify the file 104B on the source storage 132 as an expired file based on the received date of the file 104B in the meta-data 118 and the retention period from the storage policy 108. The expired file 104B may not be copied to the target storage 134 during copying of the files 104 from the source storage 132 to the target storage 134.

In addition, the processor 110 may generate aliases 106 shown as 106A and 106C for the files 104 other than expired file 104B on the source storage 132. The alias 106A may denote a location on the target storage 134 to store the file 104A. The alias 106B may denote a location on the target storage 134 to store the file 104C. In an example, the processor 110 may not generate an alias 106 for expired file 104B, which has been classified for deletion. The apparatus 100 may copy the files 104A and 104C to the locations on the target storage 134. The apparatus 100 may use a digital key 102 to verify whether the files 104A and 104C on the target storage 134 are identical to the corresponding files 104A and 104C respectively on the source storage 132. In response to the verification, the processor 110 may activate the aliases 106 and may decommission the source storage 132, e.g., the processor 110 may deactivate the source storage 132. Following activation of the aliases 106 and decommissioning the source storage 132, input/output requests may be directed to the target storage 134. For example, the apparatus 100 may direct a request to read the file 104A using the alias 106A to the file 104A on the target storage 134. In an example, the source storage 132 may be degaussed and shredded to delete the files 104 on the source storage 132.

The apparatus 100 may further include an input/output (I/O) interface 192. Generally speaking, the apparatus 100 may store data in the memory 122 and/or may manage the storage of data stored in a separate computing device, for instance, through the I/O interface 192. The I/O interface 192 may include a hardware interface and/or an interface created using machine readable instructions. The I/O interface 192 may be a network interface connected to a network through a network device, such as a router. For example, the I/O interface 192 may be a wireless local area network (WLAN) interface, a network interface controller (NIC), or the like. The WLAN may link to a network device through a radio signal. Similarly, the NIC may link to a network device through a physical connection, such as a cable.

Any input/output through the I/O interface 192 after activation of the aliases 106 may be redirected to the files 104 on the target storage 134. Additionally, meta-data 194 pertaining to the files 104 may be updated on the target storage 134 as discussed below with reference to FIGS. 2A and 2B.

In examples, the processor 110 may use the meta-data 118 to classify the files 104 on the source storage 132 as files 104 that are to be copied or to be deleted. Also, the processor 110 may use the meta-data 118 of the files 104 on the source storage 132 to build a list 202 as discussed below with reference to FIGS. 2A and 2B. The processor 110 may also copy the meta-data 118 from the source storage 132 to the target storage 134. Prior to or during the copying, the processor 110 may remove some of the information from the meta-data 118 that relates to files 104 classified for deletion.

The processor 110 may create the aliases 106 before copying the files 104 from the source storage 132 to the target storage 134. The processor 110 may generate the aliases 106 to be dynamic or static. In any regard, the aliases 106 may allow the processor 110 to quickly transition the active storage from the source storage 132 to the target storage 134 once copying is complete and the files on the target storage 134 are verified using the digital key 102. The processor 110 may initially designate the target storage 134 as a reserve (or backup) and the source storage 132 as an active device. The processor 110 may use the aliases 106 to mark the target storage 134 as being active and designate the source storage 132 as being decommissioned. The aliases 106 are discussed in further detail with reference to FIGS. 2A and 2B below.

In an example, the digital key 102 may be based on public-key cryptography. Public-key cryptography uses pairs of keys: public keys that may be disseminated widely, and private keys that may be known only to the owner. The digital key 102 may be used to authenticate files 104 that are signed using the private key to detect tampering of the files 104. Also, the digital key 102 may be used for encryption. The public-key may be used to encrypt files 104 which may only be decrypted using the private key. In an example, an RSA algorithm may be used to generate the digital key 102. The digital key 102 may be a private key and may be stored separately from the source storage 132 and/or target storage 134. The digital key 102 may be used to verify that the files 104 on the target storage 134 are identical to the corresponding files 104 on the source storage 132. Also, the digital key 102 may be used to encrypt the files 104. In an example, the digital key 102 may be used to change the encryption of the files 104 on the target storage 134 after the source storage 132 has been decommissioned to make the files 104 inaccessible on the target storage 134.

The processor 110 may prepare a list 202 as discussed below with reference to FIGS. 2A and 2B. The processor 110 may prepare the list 202 based on the storage policy 108. In examples, the storage policy 108 may be accessed from a policy server. In any regard, the processor 110 may use the list 202 with a migration script to transfer files classified to be copied from the source storage 132 to the target storage 134. The list 202 may serve as a filter to skip files during migration.

Figure 2A:
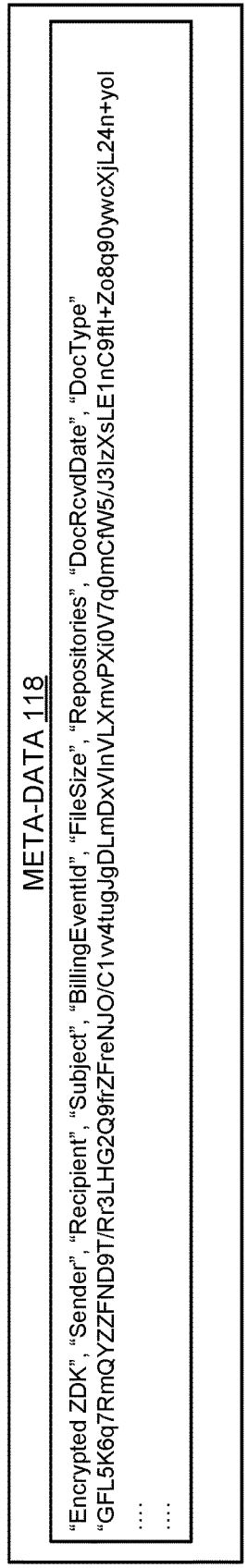
FIG. 2A shows an example meta-data stored in a source storage.

With reference now to FIG. 2A, there is shown an example meta-data 118 stored in the source storage 132. In an example, the meta-data 118 may contain information such as the date the file was received, the file size, the sender, the receiver, the subject, the repository to which the file belongs, etc. In examples, the meta-data 118 may be a comma separated value, with entries for the files 104 on the source storage 132. In other examples, the meta-data 118 may contain information of a sub-set of files on the source storage 132. For example, the files 104 on the source storage 132 may be classified into groups such as emails originating from a customer or a division of the company and stored in storage groups. Each storage group on the source storage 132 may have its own meta-data in a separate file. Source groups and target groups are discussed in further detail with respect to FIGS. 3A, 3B, and 4. Also, the target storage 134 may have meta-data 194 for storing information about the files 104 stored on the target storage 134.

Figure 2B:
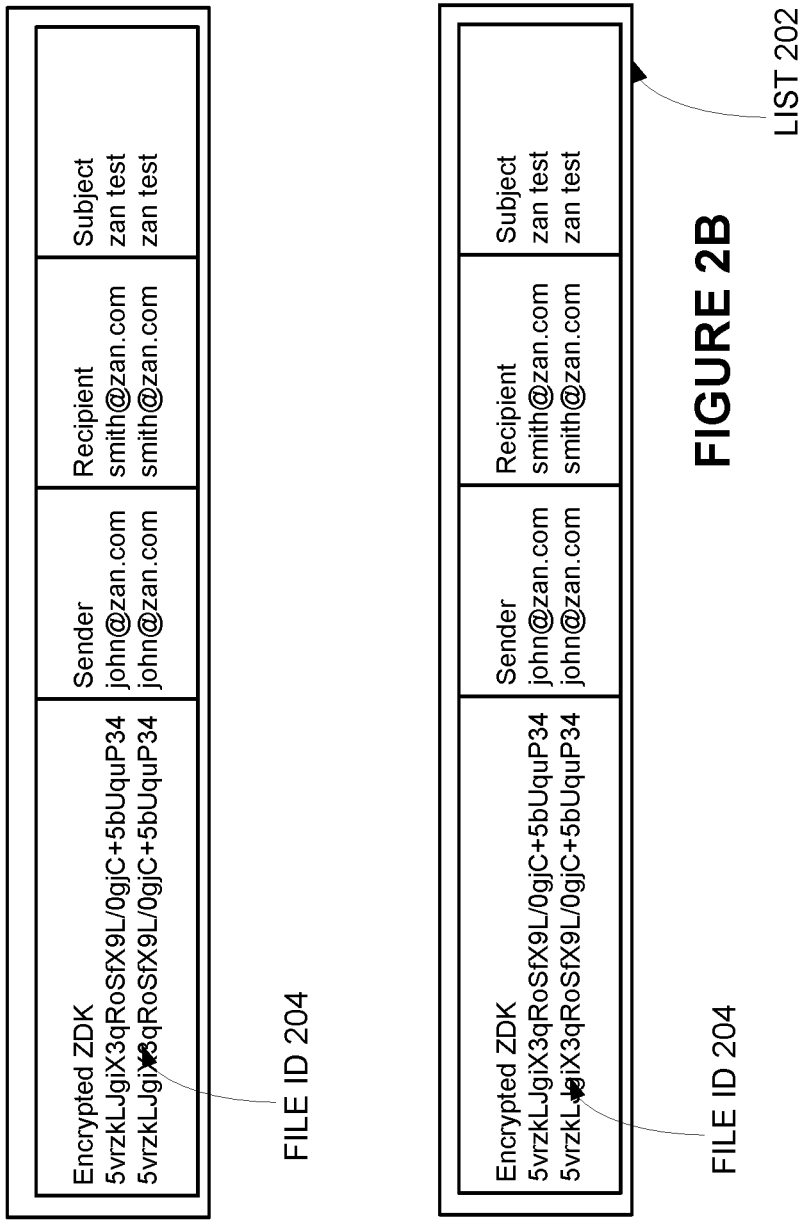
FIG. 2B shows an example meta-data being converted into a list.

FIG. 2B shows an example of the processor 110 converting a meta-data 118 into a list 202. In an example, the meta-data 118 on the source storage 132 may be classified to identify which of the files 104 are to be migrated (or copied) and which of the files 104 are to be deleted. The meta-data 118 may be converted into a list 202 by removing columns such as sender, recipient, subject, etc., and retaining only the file ID 204. In examples, the list 202 may contain the files for migration and may be described as a target-list. In another example, the list 202 may contain the files that are classified for deletion and may be described as a skip-list. The processor 110 may generate the list 202 as a target-list by removing the file ID 204 corresponding to the files classified for deletion based on the storage policy 108. Similarly, the processor 110 may generate the list 202 as a skip-list by removing the file ID 204 corresponding to files classified for copying based on the storage policy 108. In an example, the list 202 may be a plain text file. In an example, processor 110 may create a .deleted stub file for files on the skip-list in the target storage 134. In another example, the processor 110 may create a .deleted stub file for files that are not on the transfer-list. The processor 110 may use the list 202 as a filter during the migration.

In an example, the processor 110 may copy files and modified meta-data from the source storage 132 to the target storage 134. The processor 110 may modify the meta-data 118 to remove entries corresponding to the files classified for deletion before copying the meta-data to the target storage 134. In another example, the processor 110 may create the meta-data 118 based on the .deleted file stubs and the files 104 on the target storage 134. In other examples, the processor 110 may ignore the meta-data 118 marked as read-only on the source storage 132 to copy the files 104 to the target storage 134. After the files 104 are copied to the target storage 134, the meta-data 194 on the target storage 134 may be modified to make the files 104 be read-only to comply with the storage policy 108. For example, SEC files stored for compliance are required to be read-only and stored on non-erasable media. The SEC allows use of meta-data to make data read-only. The processor 110 may use the meta-data 194 on the target storage 134 to make the files read-only after the files 104 are transferred to the target storage 134.

Figure 3A:
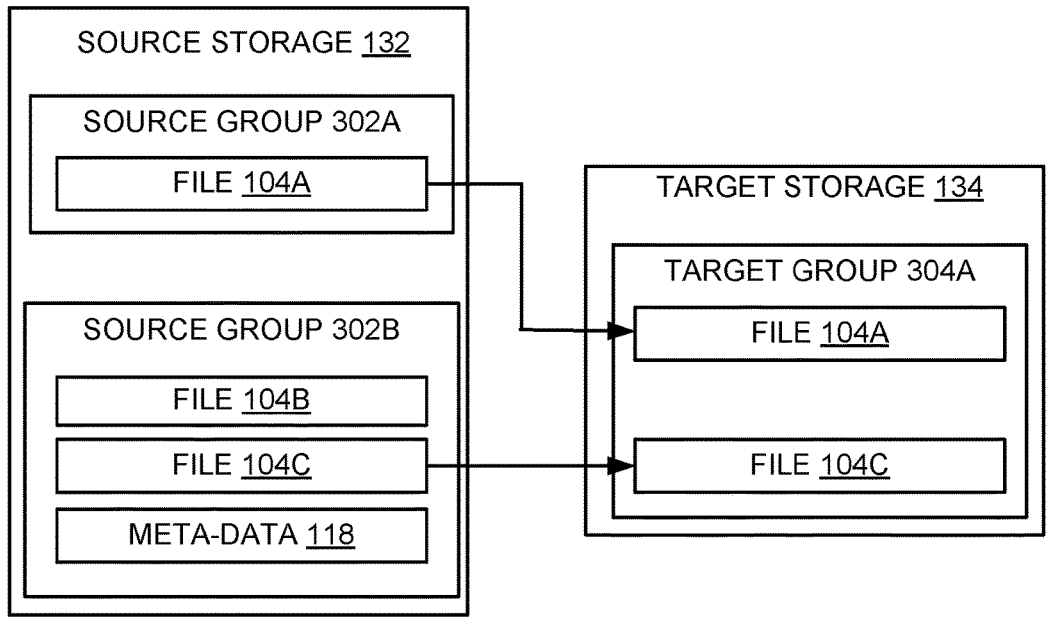
FIG. 3A shows an example many to one migration of files.
Figure 3B:
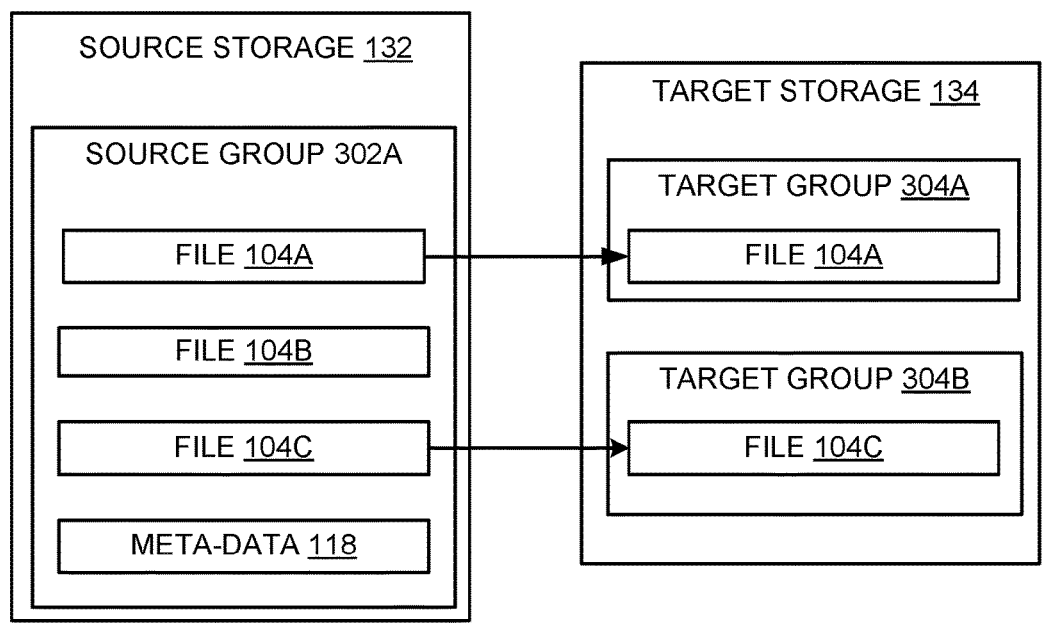
FIG. 3B shows an example one to many migration of files.

FIGS. 3A and 3B, respectively, show an example many to one migration and an example one to many migration. With reference to FIG. 3A, the source storage 132 may include source groups 302, shown as 302A and 302B. The source groups 302A and 302B may be stored on different storage devices, storage devices on different servers, virtual storage devices or other combinations of storage devices. In examples, the source groups 302A and 302B may represent virtual divisions of files 104 of an entity such as legal files, customer records, corporate minutes, etc.; similarly, the target storage 134 may contain storage groups 304, shown as 304A and 304B.

The processor 110 may delete files from a source group, e.g., 302B, during migration by leaving the files on the source storage 132 as discussed above with respect to FIGS. 1A and 1B. The processor 110 may merge the files for the source groups 302 into the target group 304A during migration. For example, when two companies merge, their customer records may be merged. Thus, FIG. 3A shows an example of many to one migration of files in which multiple groups of files 302a, 302B are merged into one merged target group 304A.

FIG. 3B shows an example one to many migration in which one group 302A of files 104 is split to multiple groups 304a, 304B of files 104. For example, the files in a one group 302A may be split to multiple groups 304A, 304B during a spinoff of a company. The processor 110 may copy the file 104A from source group 302A to target group 304A in the target storage 134. Similarly, the processor 110 may copy the file 104C from the source group 302A to the target group 304B.

Figure 4:
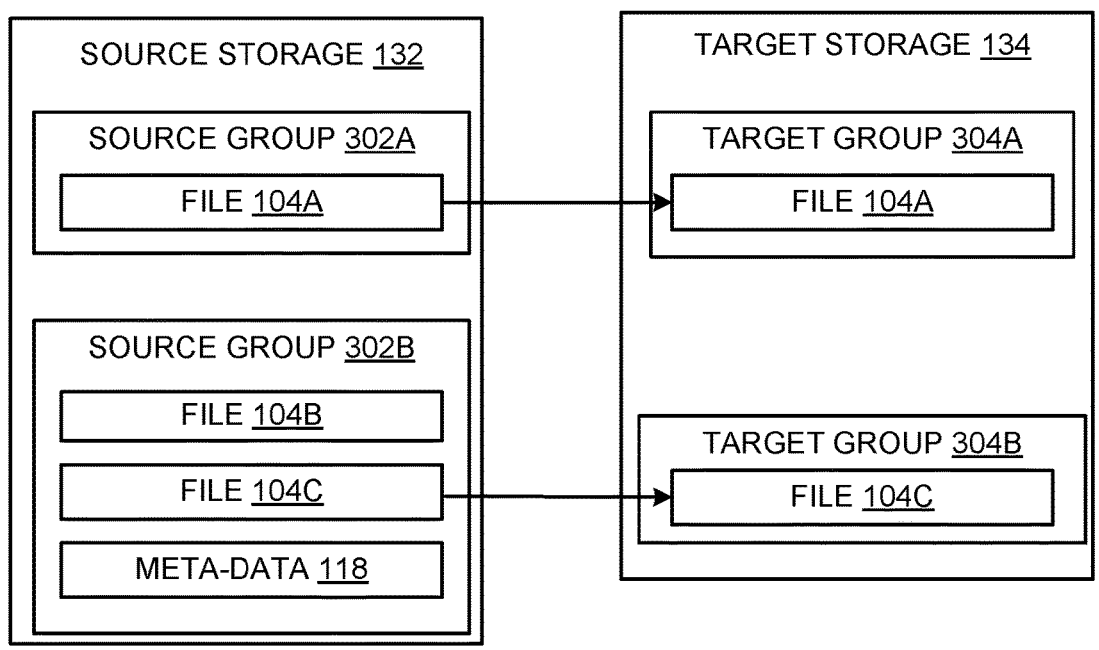
FIG. 4 shows an example many to many migration of files.

FIG. 4 shows an example many to many migration of files 104 in which multiple groups 302A, 302B of files 104 in the source storage 132 are copied as multiple groups 304A, 304B of files 104 in the target group 134. The processor 110 may copy the file 104A from the source group 302A to the target group 304A. Similarly, the processor 110 may copy the file 104C from the source group 302B to the target group 304B. The file 104B may be deleted during decommissioning of the source storage 132 as discussed above with reference to FIGS. 1A and 1B.

Figure 5:
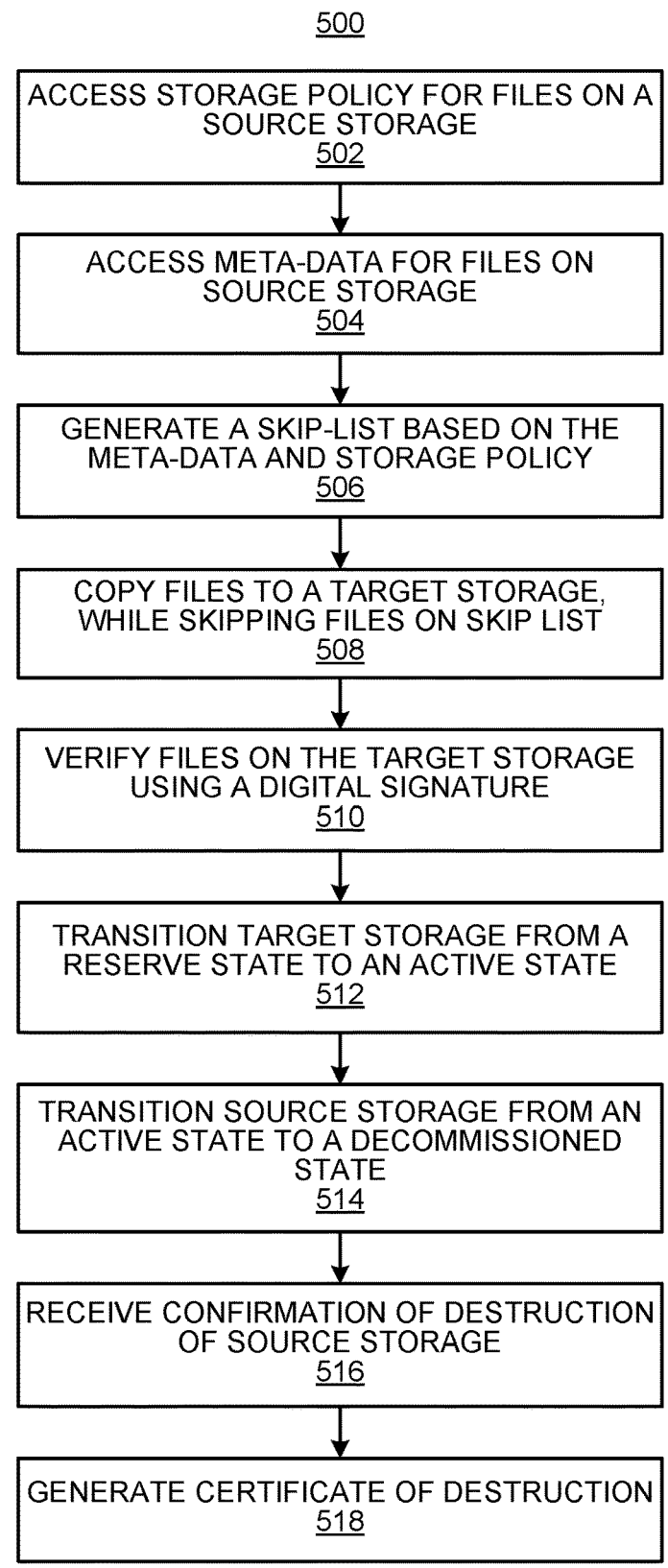
FIG. 5 shows a flow chart of an example method to decommission a source storage.

FIG. 5 shows an example method 500 to decommission a source storage 132. The processor 110 may execute the method 500 and other methods described herein. For example, the processor 110 shown in FIGS. 1A and 1B may execute the machine readable instructions 124 to execute the method 500. Although particular reference is made herein to the processor 110 executing the method 500, it should be understood that another device or multiple devices may execute the method 500 without departing from the scope of the method 500.

At block 502, the processor 110 may access the storage policy 108 as described with respect to FIGS. 1A and 1B. At block 504, the processor 110 may access the meta-data 118 for the files 104 stored on the source storage 132 as described with respect to FIGS. 1A and 1B. At block 506, the processor 110 may generate a skip-list from the meta-data 118 and the storage policy 108 as described with respect to FIGS. 2A and 2B. For example, the processor 110 may convert the meta-data 118 into a list 202 containing only the file ID 204 of files 104 that are classified for deletion based on the storage policy 108.

At block 508, the processor 110 may copy the files 104 from the source storage 132 to the target storage 134 as described with reference to FIGS. 1A and 1B. For example, the processor 110 may use the list 202 generated at block 506 as a skip-list to identify which of the files 104 that are to be copied, e.g., the files 104 that are on the skip-list may not be copied to the target storage 134. At block 510, the processor 110 may use the digital key 102 to determine whether the files 104 copied to the target storage 134 are the same as the files 104 that were classified to be copied from the source storage 132.

At block 512, the processor 110 may transition the target storage 134 from a reserve state to an active state. For example, as described with reference to FIGS. 1A and 1B, the processor 110 may generate aliases 106 to locations on the target storage 134 for the files 104 and may activate the aliases 106 to transition the target storage 134 from a reserve state to an active state.

At block 514, the processor 110 may transition the source storage 132 from an active state to a decommissioned state. For example, as described with reference to FIGS. 1A and 1B, the processor 110 may cease to direct input/output queries to the source storage 132 and instead may redirect the input/output queries to files 104 to the target storage 134 using the aliases 106. The decommissioned source storage 132 may then be degaussed and shredded to delete the files 104 stored on the source storage 132.

At block 516, the apparatus 100 may receive confirmation of destruction of the source storage 132 after degaussing and shredding to destroy the files 104 stored on the source storage 132. At block 518, the processor 110 may generate a certificate of destruction to comply with the storage policy 108. In an example, the certificate of destruction may contain the skip-list of the files that were deleted. In another example, the certificate may authenticate that data classified for transfer was retained on the target storage 134 in the same condition as was present on the source storage 132.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a processor;
a non-transitory computer readable medium storing machine readable instructions that when executed by the processor cause the processor to:
classify files stored on a source storage into files for deletion and files for migration based on a storage policy and meta-data;
generate aliases to link the files classified for migration to a location on a target storage;
modify the meta-data of the files classified for migration to permit copying of the files classified for migration to the target storage;
copy the files classified for migration from the source storage to the linked location on the target storage;
determine, using a digital key, whether the files copied onto the target storage are identical to the files classified for migration on the source storage;
in response to a determination that the copied files are identical to the files classified for migration, activate the generated aliases that point to the copied files on the target storage;
modify the meta-data of the files on the target storage to prevent copying of the files from the target storage; and
decommission the source storage.

2. The apparatus of claim 1, wherein the files are stored in source storage groups in the source storage, and wherein the instructions further cause the processor to:
copy files from the source storage groups to a target storage group in the target storage.

3. The apparatus of claim 1, wherein the files are stored in a source storage group in the source storage, and wherein the instructions further cause the processor to:
copy files from the storage group to a plurality of target storage groups in the target storage.

4. The apparatus of claim 1, wherein the files are stored in source storage groups in the source storage, and wherein the instructions further cause the processor to:
copy files from the source storage groups to target storage groups in the target storage.

5. The apparatus of claim 1, wherein the instructions further cause the processor to: identify meta-data of the files classified for migration;
copy the meta-data of the files classified for migration to the target storage;
determine whether the meta-data and the files copied to the target storage comply with the storage policy; and
decommission the source storage in response to a determination that the meta-data and the files copied to the target storage comply with the storage policy.

6. The apparatus of claim 1, wherein the instructions further cause the processor to:
modify the meta-data of the files on the source storage to generate a skip-list of the files classified for deletion.

7. The apparatus of claim 1, wherein the instructions to classify files stored on the source storage into files for deletion and files for migration further cause the processor to:
generate a skip-list of files classified for deletion and/or generate a target-list of files classified for migration.

8. A method comprising:
generating a skip-list of files on a source storage that are to be deleted based on meta-data of the files and a storage policy;
determining whether the meta-data of the files permit copying of the files;
in response to a determination that the meta-data of the files do not permit copying of the files, modifying the meta-data of the files to permit copying of the files;
copying the files from the source storage to a target storage while excluding the files on the generated skip-list;
determining, using a digital key, whether the files copied onto the target storage are identical to the files that are outside of the skip-list and are on the source storage;
in response to a determination that the files are identical, transitioning the target storage from a reserve state to an active state; and
transitioning the source storage from an active state to a decommissioned state.

9. The method of claim 8, further comprising:
identifying meta-data of the files on the skip-list;
copying meta-data of files that are not on the skip-list;
determining whether the meta-data and the files that are on the target storage comply with the storage policy; and
decommissioning the source storage in response to a determination that the meta-data and the files copied to the target storage comply with the storage policy.

10. The method of claim 8, further comprising:
modifying the meta-data of the files on the source storage to generate the skip-list of the files classified for deletion.

11. A non-transitory computer readable medium on which is stored machine readable instructions that when executed by a processor cause the processor to:
generate a skip-list of files on a source storage that are to be deleted based on meta-data and a storage policy;
copy the files from the source storage to a target storage while excluding the files on the generated skip-list;
determine, using a digital key, whether the files copied onto the target storage are identical to the files that are outside of the skip-list and are on the source storage, wherein the digital key is at least one of public-key and private key used to authenticate a file;
in response to a determination that the files are identical, transition the source storage to a decommissioned state.

12. The non-transitory computer readable medium of claim 11, wherein the instructions further cause the processor to:
identify meta-data of the files on the skip-list;
copy meta-data of files that are not on the skip-list;
determine whether the meta-data and the files that are on the target storage comply with the storage policy; and
decommission the source storage in response to a determination that the meta-data and the files copied to the target storage comply with the storage policy.

13. The non-transitory computer readable medium of claim 11, wherein the instructions further cause the processor to:
modify the meta-data of the files on the source storage to generate the skip-list of the files classified for deletion.

14. The apparatus of claim 1, wherein the aliases that link the files classified for migration to a location on a target storage are generated prior to migrating the files classified for migration.

15. The apparatus of claim 1, wherein the digital key is at least one of public-key and private key used to authenticate a file.

* * * * *